US008918009B2

(12) United States Patent
Lee et al.

(10) Patent No.: US 8,918,009 B2

(45) Date of Patent: Dec. 23, 2014

(54) IMAGE FORMING APPARATUS HAVING A WINDOW OPEN-CLOSING SHUTTER

(75) Inventors: Byung-jo Lee, Bucheon-si (KR); Gun-wook Kim, Suwon-si (KR); Jin-ho Park, Yongin-si (KR); Young-min Yoon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 180 days.

(21) Appl. No.: 13/552,254

(22) Filed: Jul. 18, 2012

(65) Prior Publication Data

US 2013/0170853 A1 Jul. 4, 2013

(30) Foreign Application Priority Data

Dec. 28, 2011 (KR) ........................ 10-2011-0144604

(51) Int. Cl.
*G03G 21/00* (2006.01)
*H04N 1/04* (2006.01)
*B41J 27/00* (2006.01)

(52) U.S. Cl.
USPC ............. 399/98; 399/110; 399/206; 399/207; 358/474; 358/475; 347/241

(58) Field of Classification Search
USPC ................... 399/98, 110, 151, 205, 206, 207; 358/474, 475, 509; 347/241
See application file for complete search history.

(56) References Cited

U.S. PATENT DOCUMENTS

| | | | | |
|---|---|---|---|---|
| 7,203,444 | B2 * | 4/2007 | Yamazaki | 399/98 |
| 7,352,377 | B2 * | 4/2008 | Matsutomo | 347/136 |
| 7,869,101 | B2 * | 1/2011 | Shoji et al. | 358/474 |
| 7,872,664 | B2 * | 1/2011 | Yamakawa et al. | 347/241 |
| 8,081,200 | B2 * | 12/2011 | Yamada et al. | 347/136 |
| 2005/0243156 | A1 * | 11/2005 | Matsutomo | 347/136 |

* cited by examiner

*Primary Examiner* — Francis Gray
(74) *Attorney, Agent, or Firm* — Staas & Halsey LLP

(57) ABSTRACT

An image forming apparatus includes a main body of the image forming apparatus; at least one image forming unit disposed in the main body; a light scanning unit that is disposed in the main body and scans light to form an electrostatic latent image on a photosensitive medium of the at least one image forming unit; a window open-closing shutter that is disposed to slidably move on a surface of the light scanning unit from which light emits, and moves between an open position where a light moving path is opened and a blocking position where the light moving path is blocked; a shutter operating lever that is disposed in the main body, and activates the window open-closing shutter to be positioned at either of the open position and the blocking position; and a pressure member that is disposed in the main body and presses the shutter operating lever.

20 Claims, 12 Drawing Sheets

IMAGE FORMING APPARATUS HAVING A WINDOW OPEN-CLOSING SHUTTER

CROSS-REFERENCE TO RELATED APPLICATIONS

This application claims the priority benefit under 35 U.S.C. §119(a) from Korean Patent Application No. 10-2011-0144604 filed Dec. 28, 2011 in the Korean Intellectual Property Office, the disclosure of which is incorporated herein by reference in its entirety.

BACKGROUND

1. Field

The following description relates to an image forming apparatus. More particularly, the present disclosure relates to an image forming apparatus having a window open-closing shutter and a shutter operating lever that can selectively open and close a window member of a light scanning unit that scans light to form an electrostatic latent image.

2. Description of the Related Art

Generally, an electro-photographic image forming apparatus, such as a copy machine, a light printer, a facsimile machine, or a multifunctional product, for example, includes a light scanning unit scanning light corresponding to printing data for forming an electrostatic latent image on a photosensitive medium.

The light scanning unit uses an optical deflector, such as a rotating polygon mirror, to periodically deflect light emitted from a light source, and uses an –θ lens to focus the light on a surface of the photosensitive medium having photosensitivity, such as a photosensitive drum, to form an electrostatic latent image thereon.

The light scanning unit may include a window open-closing shutter that can selectively open and close a window member from which light is emitted to prevent the window member from being contaminated by developer and paper dust generated during printing.

However, in order to perform an open-closing operation, the window open-closing shutter of the conventional light scanning unit uses a separate driving apparatus and a power transmitting apparatus, such as gears or cams, to transmit power generated by the driving apparatus to the window open-closing shutter. Accordingly, the light scanning unit having the window open-closing shutter has a complex structure and a high material cost, and, due to the difficulty of assembly and repair, management fees of the image forming apparatus are increased.

Accordingly, the light scanning unit may be formed to have no window open-closing shutter. However, if there is no window open-closing shutter, when an image forming unit or a waste developer receptacle is separated from an image forming apparatus, developer is scattered so as to contaminate the window member of the light scanning unit, which results in an adverse effect on image quality.

SUMMARY

The present disclosure has been developed in order to overcome the above drawbacks and other problems associated with the conventional arrangement. The following description relates an image forming apparatus having a light scanning unit that can open and close a window open-closing shutter without using a separate driving apparatus and a power transmitting apparatus.

The above aspect and/or other feature of the present disclosure can be achieved by providing an image forming apparatus, which may include a main body of the image forming apparatus; at least one image forming unit disposed in the main body; a light scanning unit that is disposed in the main body and scans light to form an electrostatic latent image on a photosensitive medium of the at least one image forming unit; a window open-closing shutter that is disposed to slidably move on a surface of the light scanning unit from which light emits, and moves between an open position where a light moving path is opened and a blocking position where the light moving path is blocked; a shutter operating lever that is disposed in the main body, and activates the window open-closing shutter to be positioned at either of the open position and the blocking position; and a pressure member that is disposed in the main body and presses the shutter operating lever.

The window open-closing shutter may include an inclined portion to come in contact with the shutter operating lever. When an end of the shutter operating lever presses the inclined portion, the window open-closing shutter may be positioned at the open position, and when the end of the shutter operating lever does not press the inclined portion, the window open-closing shutter may be positioned at the blocking position.

The window open-closing shutter and the shutter operating lever may move in directions perpendicular to each other on the same plane.

The window open-closing shutter may move in a sub-scanning direction and the shutter operating lever moves in a main scanning direction.

The image forming apparatus may include a restoring member that restores the window open-closing shutter to an original position thereof.

The restoring member may include a compression coil spring.

The pressure member may include a waste developer receptacle disposed at a side of the at least one image forming unit in the main body.

The pressure member may include a door that is disposed in the main body, and opens and closes a portion of the main body to access an interior of the main body.

The image forming apparatus may include a lever guiding member that is disposed in the main body and guides the shutter operating lever to slidably move.

The image forming apparatus may include an elastic member that is disposed in the lever guiding member and elastically supports the shutter operating lever.

The light scanning unit may include a window member through which the light passes, and a window cleaning member that is disposed on the window open-closing shutter and cleans the window member by sliding movement of the window open-closing shutter.

The window cleaning member may be formed of rubber.

Other objects, advantages, and salient features of the present disclosure will become apparent from the following detailed description, which, taken in conjunction with the annexed drawings, discloses embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components, and structures.

DETAILED DESCRIPTION

Hereinafter, certain embodiments of the present disclosure will be described in detail with reference to the accompanying drawings.

The matters defined herein, such as a detailed construction and elements thereof, are provided to assist in a comprehensive understanding of this description. Thus, it is apparent that embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

Figure 1:
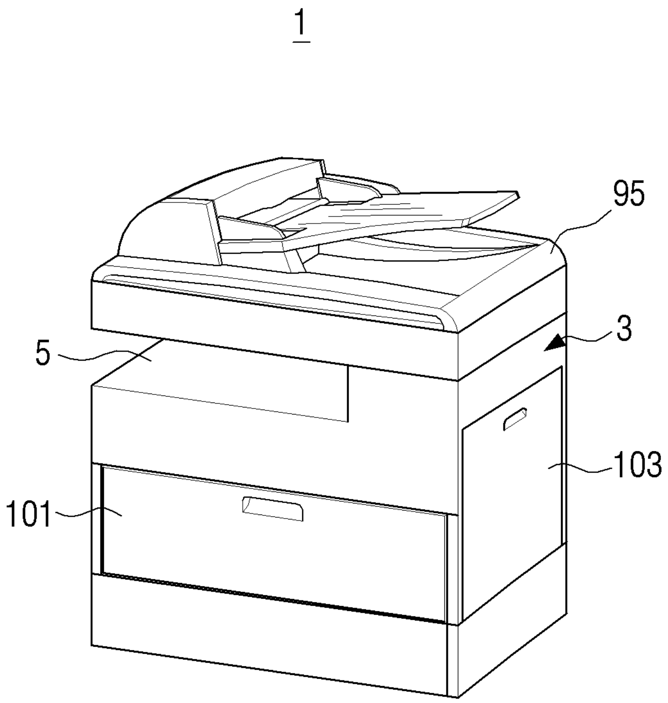
FIG. 1 is a perspective view schematically illustrating an image forming apparatus.
Figure 2:
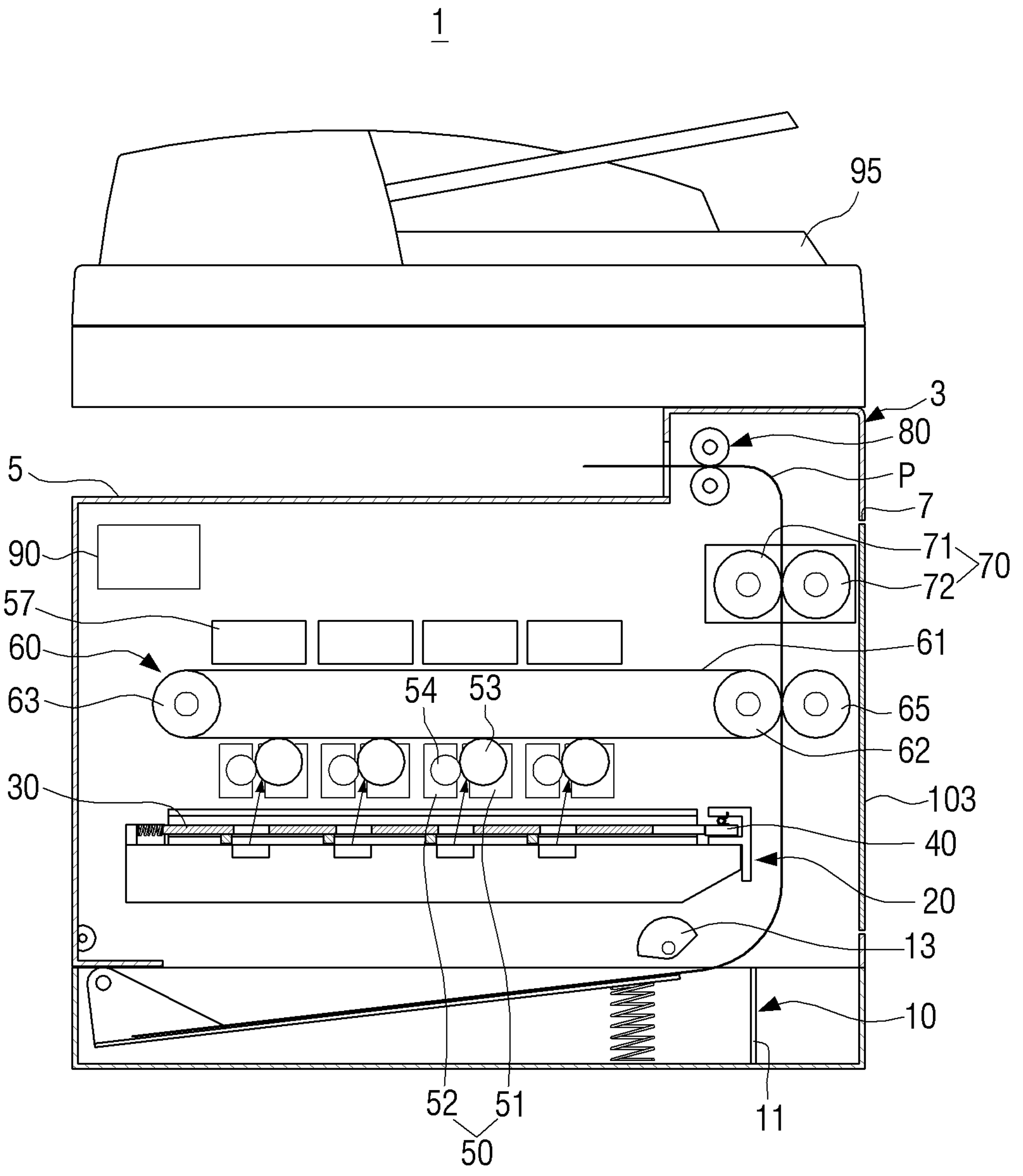
FIG. 2 is a sectional view schematically illustrating an image forming apparatus.

FIG. 1 is a perspective view schematically illustrating an image forming apparatus. FIG. 2 is a sectional view schematically illustrating an image forming apparatus. However, because the present disclosure is not directed to an internal structure of a scanning unit, in FIG. 2, the scanning unit is not illustrated by a cross-section for convenience.

Referring to FIGS. 1 and 2, an image forming apparatus 1 according to an embodiment of the present disclosure may include a main body 3, a printing media feeding unit 10, a light scanning unit 20, a shutter operating lever 40, an image forming unit 50, an intermediate transfer belt 60, a transfer roller 65, a fusing unit 70, a printing media discharging unit 80, and a scanning unit 95.

The main body 3 forms an outer appearance of the image forming apparatus 1, is formed in a substantially rectangular shape, and supports and secures the printing media feeding unit 10, the light scanning unit 20, the shutter operating lever 40, the image forming unit 50, the intermediate transfer belt 60, the transfer roller 65, the fusing unit 70, the printing media discharging unit 80, and the scanning unit 95.

A first opening 6 through which a waste developer receptacle 100 and the image forming unit 50 are mounted into and separated from the main body 3 is formed on one surface of the main body 3. Hereinafter, the surface on which the first opening 6 is formed is referred to a front surface of the main body 3.

Further, when the waste developer receptacle 100 is mounted into or separated from the inside of the main body 3 through the first opening 6, the waste developer receptacle 100 may be configured to activate the shutter operating lever 40. In other words, the waste developer receptacle 100 may be disposed to play a role of a pressure member to activate the shutter operating lever 40.

Figure 3:
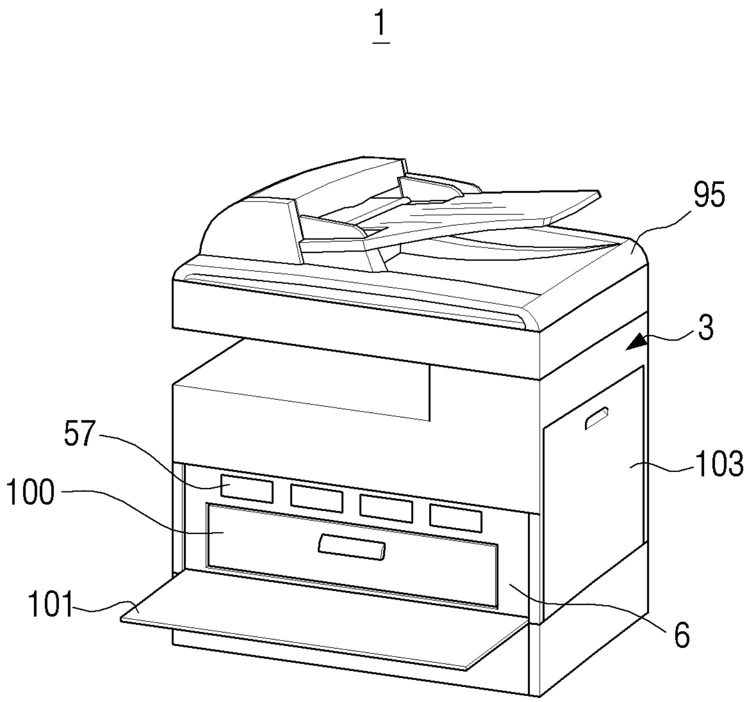
FIG. 3 is a perspective view illustrating an image forming apparatus of which a front cover is opened.
Figure 4:
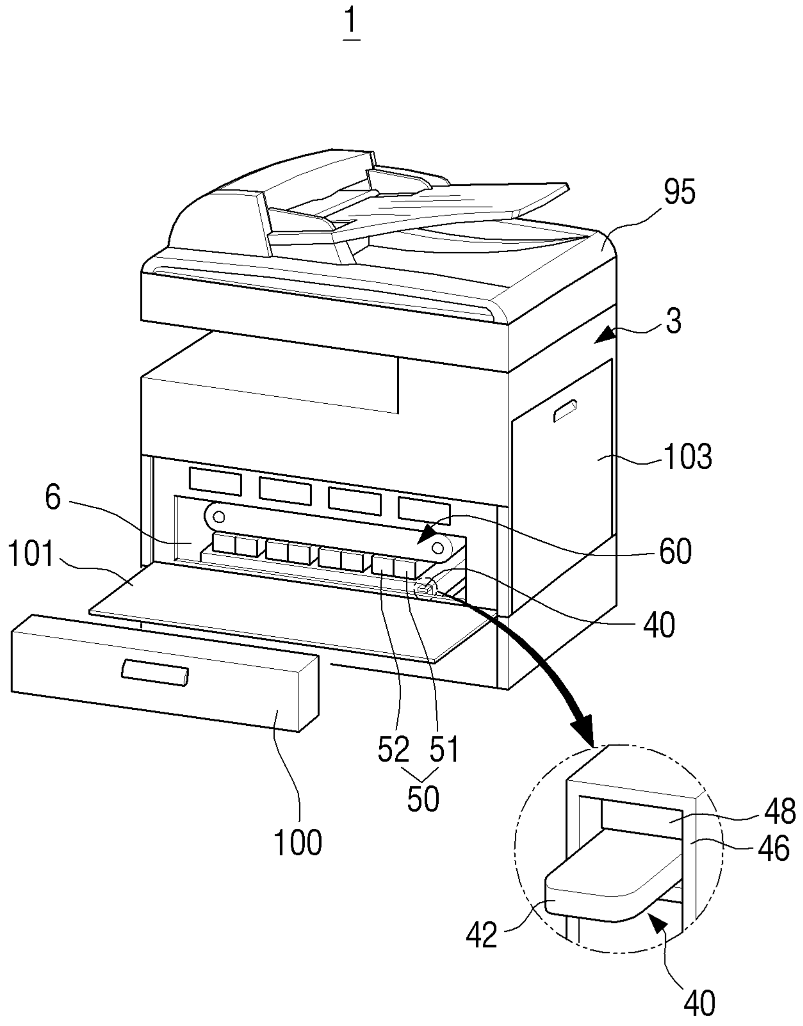
FIG. 4 is a perspective view illustrating the image forming apparatus of FIG. 3 from which a waste developer receptacle is separated.
Figure 5:
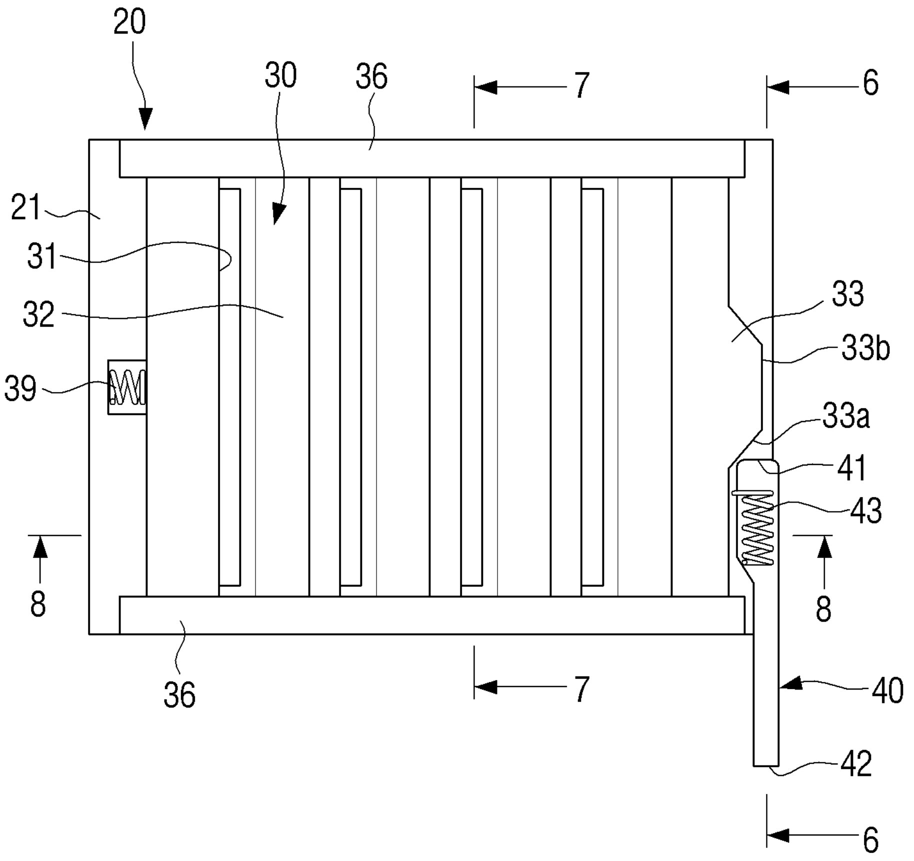
FIG. 5 is a plan view illustrating a light scanning unit disposed in the image forming apparatus of FIG. 2.
Figure 6:
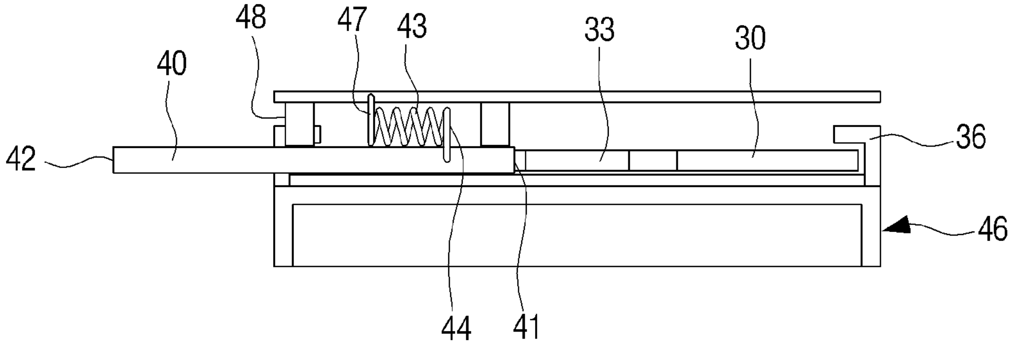
FIG. 6 is a sectional view illustrating the light scanning unit of FIG. 5 taken along a line 6-6 in FIG. 5.

FIG. 3 illustrates an open state of a front cover 101 of the image forming apparatus 1 that is formed to open and close the first opening 6. The front cover 101 may be disposed by a hinge to rotate a predetermined angle with respect to the main body 3 of the image forming apparatus 1. Alternatively, although not illustrated, the front cover 101 may be formed to be separated from the main body 3 of the image forming apparatus 1. FIG. 4 illustrates the image forming apparatus 1 from which the waste developer receptacle 100 is separated through the first opening 6 after the front cover 101 thereof is opened.

When the front cover 101 is opened, as illustrated in FIG. 3, the waste developer receptacle 100 and a plurality of developer supplying receptacles 57 are visible through the first opening 6. The waste developer receptacle 100 and the plurality of developer supplying receptacles 57 can be separated from and mounted through the first opening 6. If the waste developer receptacle 100 is separated, as illustrated in FIG. 4, the intermediate transfer belt unit 60 and a plurality of image forming units 50 are shown. After the waste developer receptacle 100 is separated, the image forming unit 50 can be separated from or mounted into the main body 3 through the first opening 6.

Alternatively, the shutter operating lever 40 may be formed to be activated by open-closing operation of the front cover 101. In other words, the front cover 101 may be formed to perform a function of a pressure member that activates the shutter operating lever 40. However, if the shutter operating lever 40 is formed to be activated by the front cover 101, a window open-closing shutter 30 is frequently opened and closed. Therefore, the shutter operating lever 40 may be formed to be linked to a mounting and separating operation of the waste developer receptacle 100 so that the window open-closing shutter 30 is opened and closed only when developer is scattered as described above.

The printing media feeding unit 10 is disposed in a bottom of the main body 3 and can store a certain sheets of printing media P. The printing media feeding unit 10 may include a printing medium feeding cassette 11 to store printing media P and a pickup roller 13 that can pick up the stored printing media P one by one. The pickup roller 13 picks up a printing medium P one by one and feeds the printing medium P to the transfer roller 65 according to a printing command of the control portion 90.

The image forming unit 50 forms images corresponding to printing data and is configured of a photosensitive medium unit 51 and a developing roller unit 52. The photosensitive medium unit 51 and the developing roller unit 52 may be formed separately from each other. The photosensitive medium unit 51 may include a photosensitive medium 53 on a surface of which an electrostatic latent image is formed, a charging roller (not illustrated) for charging the surface of the photosensitive medium 53, and a cleaning member (not illustrated) for removing waste developer remaining on the surface of the photosensitive medium 53. The developing roller unit 52 may include a developing roller 54 that supplies developer to the photosensitive medium 53 to develop an electrostatic latent image into a developer image, a developer supplying roller (not illustrated) that supplies developer to the developing roller 54, a blade (not illustrated) that regulates developer attached on the surface of the photosensitive medium 53 to have a predetermined thickness and charges the developer, and a developer storing portion (not illustrated) that stores a predetermined amount of developer. The image forming apparatus 1 may include at least one image forming unit 50. In an embodiment, for forming a color image, four image forming units 50 are disposed in a line. Also, after the front cover 101 is opened and the waste developer receptacle 100 is separated, the image forming unit 50 can be accessed. In other words, after the front cover 101 is opened and the waste developer receptacle 100 is separated from the main body 3, the developing roller unit 52 and the photosensitive medium unit 51 can be mounted into or separated from the main body 3 through the first opening 6.

The waste developer receptacle 100 is formed to receive waste developer removed from the photosensitive medium unit 51 after an image is formed. Accordingly, although not illustrated in FIGS. 1 and 2, a waste developer discharging member (not illustrated) that discharges waste developer removed from the photosensitive medium unit 51 into the waste developer receptacle 100 is disposed between the photosensitive medium unit 51 and the waste developer receptacle 100.

Figure 7:
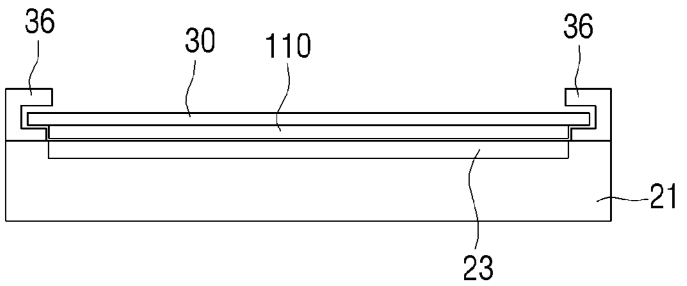
FIG. 7 is a sectional view illustrating the light scanning unit of FIG. 5 taken along a line 7-7 in FIG. 5.
Figure 8:
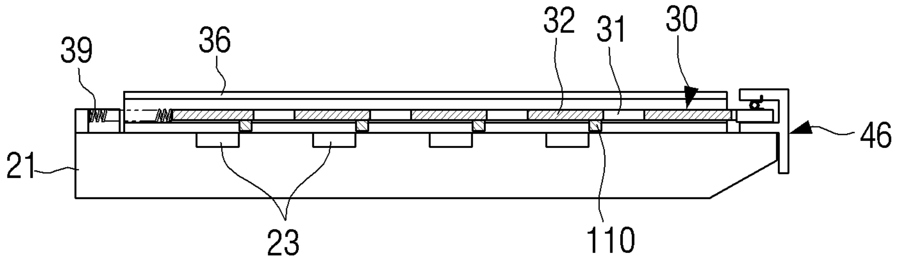
FIG. 8 is a sectional view illustrating the light scanning unit of FIG. 5 taken along a line 8-8 in FIG. 5.

The light scanning unit 20 scans light corresponding to printing data to the photosensitive medium 53 of the image forming unit 50 according to a printing command of the control portion 90 to form an electrostatic latent image on the surface of the photosensitive medium 53. The light scanning unit 20 includes a housing 21, a light source (not illustrated) that is disposed inside the housing and emits light, a polygon mirror (not illustrated) that rotates and scans the light emitted from the light source, an f−θ lens (not illustrated) to focus the light reflected from the polygon mirror on the surface of the photosensitive medium 53, and a window member 23 which is disposed on a top surface of the housing 21 and the light coming from the f−θ lens passes through. The structure of the light scanning unit 20 as described above is the same as that of a conventional light scanning unit. Therefore, a detailed description thereof will be omitted. Also, in FIGS. 7 and 8, the light source, polygon mirror, f−θ lens, and like disposed inside the housing 21 of the light scanning unit 20 are omitted and only window member 23 required for explanation of the present disclosure is illustrated.

At least one window member 23 is disposed on the top surface of the housing 21 of the light scanning unit 20. Accordingly, the light emitted from the light source passes through the f−θ lens and the window member 23 and then is scanned to the photosensitive medium 53. In an embodiment, because four image forming units 50 are used, the light scanning unit 20 includes four light sources. Accordingly, four window members 23 also are disposed to correspond to the image forming units 50.

A window open-closing shutter 30 is disposed on a top surface of the housing 21 of the light scanning unit 20. The window open-closing shutter 30 is disposed to slidably move with respect to the top surface of the housing 21. In other words, the window open-closing shutter 30 is spaced apart at a predetermined distance from the top surface of the housing 21. Opposite side ends of the window open-closing shutter 30 are supported by shutter guiding members 36 projecting from the top surface of the housing 21. Accordingly, the window open-closing shutter 30 can reciprocate linearly along the shutter guiding members 36 in directions of arrows A and B.

An inclined portion 33 is formed on one end of the window open-closing shutter 30. The inclined portion 33 is formed to project in a trapezoidal shape from a middle portion of the one end of the window open-closing shutter 30. An inclined surface 33*a* of the inclined portion 33 is in contact with a first end of the shutter operating lever 40 and converts the linear reciprocation of the shutter operating lever 40 into the linear reciprocation of the window open-closing shutter 30. Accordingly, when the shutter operating lever 40 reciprocates linearly, the window open-closing shutter 30 is reciprocated linearly in a direction of 90 degrees with respect to the moving direction of the shutter operating lever 40.

A restoring member 39 is disposed on the other end of the window open-closing shutter 30, that is, on the end opposite where the inclined portion 33 is disposed. When the shutter operating lever 40 does not apply force to the inclined portion 33, the restoring member 39 allows the window open-closing shutter 30 to always return to an original position thereof, that is, where a blocking portion 32 of the window open-closing shutter 30 covers the window member 23. A compression coil spring may be used as the restoring member 39. However, the compression coil spring is only one example: therefore, various members can be used as the restoring member 39 as long as they can apply force to the window open-closing shutter 30 so as to restore the window open-closing shutter 30 to the original position thereof.

Also, the window open-closing shutter 30 is provided with four light slots 31 and four blocking portions 32. The light slot 31 is formed to correspond to the window member 23 disposed on the housing 21 of the light scanning unit 20. Accordingly, when the light slot 31 is positioned in a location where the light slot 31 is aligned with the window member 23, a light passing path is opened so that light emitted from the light source is scanned to the photosensitive medium 53. If the light slot 31 is not aligned with the window member 23, the blocking portion 32 of the window open-closing shutter 30 covers the window member 23 to block the light passing path. As a result, the light emitting from the light source is not scanned to the photosensitive medium 53. In a below explanation, a position of the window open-closing shutter 30 where the light slot 31 is aligned with the window member 23 is referred to an open position, and a position of the window open-closing shutter 30 where the light slot 31 is not aligned with the window member 23 and the blocking portion 32 covers the window member 23 is referred to a blocking position. Accordingly, the window open-closing shutter 30 can reciprocate linearly between the open position and the blocking position.

Further, a window cleaning member 110 may be disposed on a bottom surface of the window open-closing shutter 30 to clean the top surface of the window member 23. The window cleaning member 110 is disposed to rub against the top surface of the window member 23 when the window open-closing shutter 30 reciprocates linearly. The window cleaning member 110 is disposed at a side of the light slot 31, and has a length longer than that of the light slot 31. Also, the height of the window cleaning member 110 is determined so that when the window open-closing shutter 30 reciprocates linearly, the window cleaning member 110 is in contact with the top surface of the window member 23 and removes developer or/and paper dust attached on the window member 23. Accordingly, the window cleaning member 110 is formed to have the number corresponding to the number of the window member 23. In an embodiment, because there are four window members 23, four window cleaning members 110 are provided. The window cleaning member 110 may be formed of a material such as rubber that can remove developer and paper dust attached on the window member 23.

The shutter operating lever 40 is formed in a substantially bar shape and is disposed near where the light scanning unit 20 is disposed in the main body 3. In other words, a first end 41 of the shutter operating lever 40 is in contact with the inclined portion 33 of the window open-closing shutter 30 of the light scanning unit 20 mounted in the main body 3 and a second end 42 opposite to the first end 41 is disposed to project in the first opening 6 as illustrated in FIG. 4. The shutter operating lever 40 may be activated by a pressure member that is detachably mounted in the main body 3. FIGS. 3 and 4 illustrate the image forming apparatus 1 using the waste developer receptacle 100 as the pressure member. Although not illustrated, the photosensitive medium unit 51 or the developing roller unit 52 configuring the image forming unit 50 may be used as the pressure member. In this case, when any one of four photosensitive medium units 51 and four developing roller units 53 is separated from the main body 3, the shutter operating lever 40 is formed to be activated. As a result, when the photosensitive medium unit 51 or the developing roller unit 53 is separated, although developer is scattered, the light scanning unit 20 can be prevented from being contaminated by the scattered developer.

The shutter operating lever 40 is supported to slidably move by a lever guiding member 46. The lever guiding member 46 is disposed in the main body 3 of the image forming apparatus 1 and guides the shutter operating lever 40 to reciprocate linearly, that is, to perform a sliding movement in a direction perpendicular to the moving direction of the window open-closing shutter 30. The lever guiding member 46 supports the shutter operating lever 40 to move in a main scanning direction, that is, in a lengthwise direction of the light slot 31 of the window open-closing shutter 30 (in a direction parallel to arrow D). When the shutter operating lever 40 moves in the main scanning direction, the window open-closing shutter 30 is moved in a sub scanning direction (in a direction parallel to arrow A) perpendicular to the main scanning direction by the inclined portion 33.

An elastic member 43 is disposed between the lever guiding member 46 and the shutter operating lever 40. The elastic member 43 elastically supports the shutter operating lever 40 in the direction away from the inclined portion 33 of the window open-closing shutter 30 (in a direction of arrow C). One end of the elastic member 43 is fixed to a protrusion 44 of the shutter operating lever 40 and the other end of the elastic member 43 is fixed to a protrusion 47 of the lever guiding member 46 so that the elastic member 43 can apply force to the shutter operating lever 40 in the direction of arrow C. Accordingly, if no force is applied to the shutter operating lever 40 from the outside, the shutter operating lever 40 does not apply force to the inclined portion 33 of the window open-closing shutter 30. Further, a plurality of supporting protrusions 48 may be formed in the lever guiding member 46 to support the shutter operating lever 40 so that the shutter operating lever 40 can slidably move in a stable state.

As described above, because the shutter operating lever 40 is supported to linearly move by the lever guiding member 46 disposed in the main body 3 of the image forming apparatus 1, when the second end 42 of the shutter operating lever 40 receives force, the window open-closing shutter 30 of the light scanning unit 20 is opened. When the force is removed from the second end 42 of the shutter operating lever 40, the window open-closing shutter 30 of the light scanning unit 20 is closed.

The intermediate transfer belt unit 60 onto which a developer image formed on the photosensitive medium 53 of each of the four image forming units 50 is overlappingly transferred forms a color image. The intermediate transfer belt unit 60 includes an intermediate transfer belt 61, a driving roller 62, and a driven roller 63 that drive the intermediate transfer belt 61 to move in an endless track motion. The intermediate transfer belt unit 60 may be formed in one unit. A second opening 7 through which the intermediate transfer belt unit 60 can be mounted into and separated from the main body 3 may be formed on a side surface of the main body 3. The main body 3 may be provided with a side cover 103 to open and close the second opening 7. Accordingly, when the side cover 103 is opened, the intermediate transfer belt unit 60 can be mounted into and separated from the main body 3 through the second opening 7.

At least one developer supplying receptacle 57 may be disposed above the intermediate transfer belt unit 60. The developer supplying receptacle 57 stores a predetermined developer, and supplies developer to the developing roller unit 52 of the image forming unit 50. The developing roller unit 52 and the developer supplying receptacle 57 are connected with each other by a connecting member (not illustrated). Accordingly, the developer stored in the developer supplying receptacle 57 is supplied to the developing roller unit 52 through the connecting member. The developer supplying receptacle 57 may be provided with the same number as that of the image forming unit 50. In the present embodiment, because four image forming units 50 are disposed, the four developer supplying receptacles 57 also are disposed.

The transfer roller 65 is disposed to rotate in contact with the intermediate transfer belt 61, and allows the color developer image formed on the intermediate transfer belt 61 to be transferred onto a printing medium P entering between the transfer roller 65 and the intermediate transfer belt 61.

The fusing unit 70 applies heat and pressure to the printing medium P that has passed the transfer roller 65 so as to fuse the transferred developer image onto the printing medium P. The fusing unit 70 includes a pressing roller 71 and a heating roller 72 that rotate to face each other.

The printing media discharging unit 80 discharges the printing medium P on which the developer image is fused during passage of the fusing unit 70 onto a printing media discharging tray 5 outside the main body 3. The printing media discharging unit 80 may have two printing media discharging rollers.

The scanning unit 95 is disposed above the printing media discharging unit 80 and the printing media discharging tray 5, and can read a document to get an image data. A scanning sensor (not illustrated) to read a document is disposed in the scanning unit 95.

Hereinafter, operation of the window open-closing shutter 30 of the image forming apparatus 1 according to an embodiment of the present disclosure having the structure as described above will be explained with reference to accompanying drawings.

Figure 9A:
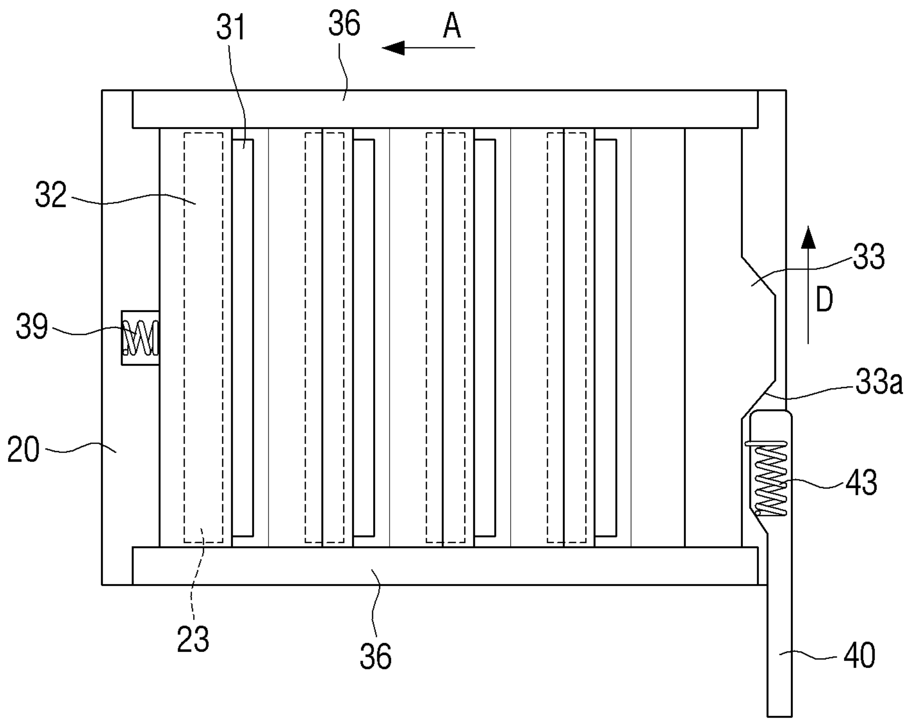
FIGS. 9A, 9B, and 9C are plan views illustrating an operation of a window open-closing shutter of a light scanning unit in an image forming apparatus.

In an assembly process for assembling the image forming apparatus 1, when the light scanning unit 20 is mounted in the main body 3 of the image forming apparatus 1, as illustrated in FIG. 9A, the inclined portion 33 of the window open-closing shutter 30 is positioned near the first end of the shutter operating lever 40 disposed in the main body 3. At this time, because the inclined portion 33 of the window open-closing shutter 30 receives no force from the shutter operating lever 40, the blocking portion 32 of the window open-closing shutter 30 covers the window member 23 of the window open-closing shutter 30. In other words, the window open-closing shutter 30 is positioned at the blocking position. Also, the second end 42 of the shutter operating lever 40, as illustrated in FIG. 4, projects in the first opening 6 of the front surface of the main body 3 by the elastic member 43.

Figure 9B:
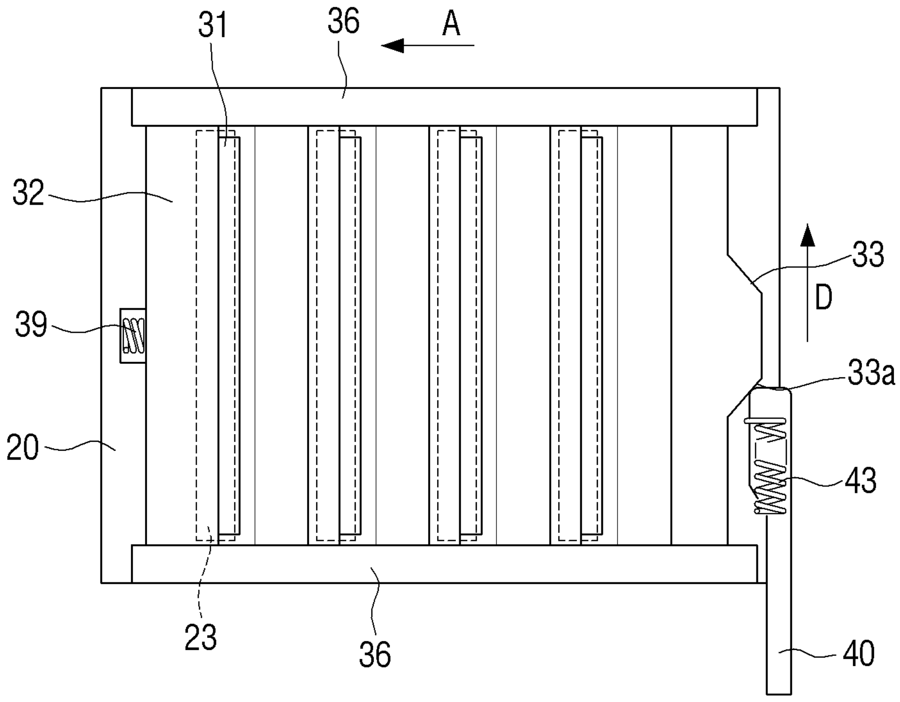
Figure 9C:
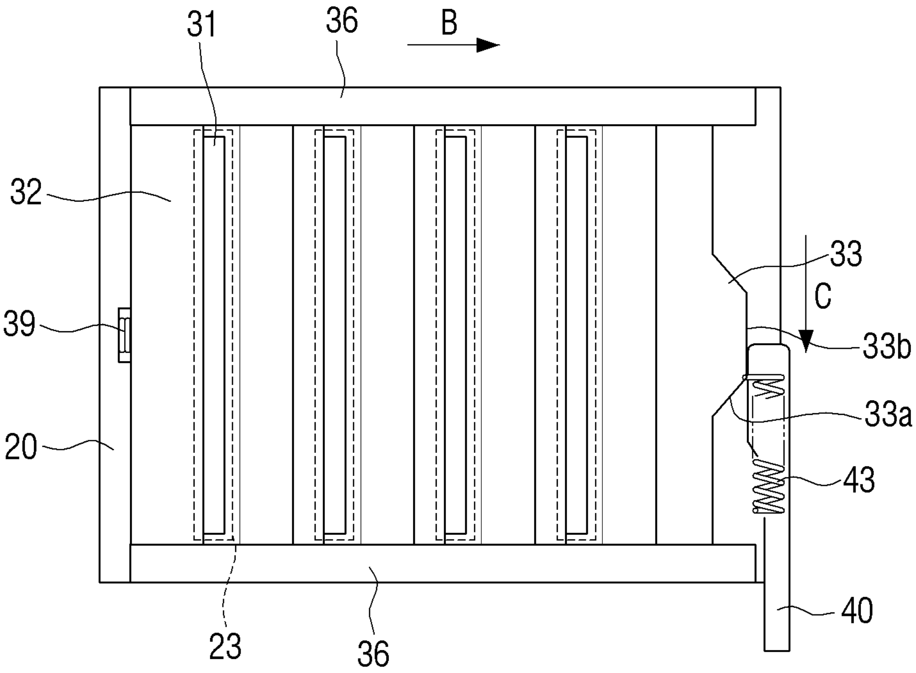

Next, a worker mounts the waste developer receptacle 100 into the first opening 6. If the waste developer receptacle 100 is mounted into the first opening 6, the waste developer receptacle 100 presses the projecting second end 42 of the shutter operating lever 40. If the waste developer receptacle 100 presses the second end 42 of the shutter operating lever 40, the shutter operating lever 40 is moved toward the inclined portion 33 of the window open-closing shutter 30. In other words, the shutter operating lever 40 moves in a direction of arrow D in FIG. 9B. If the shutter operating lever 40 moves in the direction of arrow D, the first end 41 of the shutter operating lever 40 pushes the inclined surface 33*a* of the inclined portion 33 of the window open-closing shutter 30 so that the window open-closing shutter 30 is moved in the direction of arrow A. After the shutter operating lever 40 is completely pushed by the waste developer receptacle 100, as illustrated in FIG. 9C, the shutter operating lever 40 is positioned at a bottom end 33*b* of the inclined portion 33 of the window open-closing shutter 30. As a result, because the window open-closing shutter 30 is positioned at the open position, the light slot 31 of the window open-closing shutter 30 is positioned above the window member 23 so that light emitted from the window member 23 can pass through the light slot 31 and then become incident on the photosensitive medium 53.

Accordingly, after the waste developer receptacle 100 is mounted, the image forming apparatus 1 can normally perform printing.

While the image forming apparatus 1 continues to print, the waste developer receptacle 100 is filled with waste developer. Then, a user separates the waste developer receptacle 100 from the image forming apparatus 1 and then empties waste developer from the waste developer receptacle 100.

To do this, the user opens the front cover 101 of the main body 3. Then, as illustrated in FIG. 3, the waste developer receptacle 100 is exposed through the first opening 6. Next, after the user separates the waste developer receptacle 100 from the image forming apparatus 1, the force applied to the shutter operating lever 40 by the waste developer receptacle 100 is removed. Then, the shutter operating lever 40 is moved in a direction of arrow C in FIG. 9C by the elastic member 43 and then the second end 42 of the shutter operating lever 40 projects in the first opening 6. When the shutter operating lever 40 moves in the direction of arrow C in FIG. 9C, the window open-closing shutter 30 is moved in the direction of arrow B in FIG. 9C by the restoring member 39. When the window open-closing shutter 30 moves in the direction of arrow B, the light slot 31 is moved out of above the window member 23 and the blocking portion 32 of the window open-closing shutter 30 is positioned above the window member 23 so that the window open-closing shutter 30 is restored to the state of FIG. 9A, that is, the blocking position. Accordingly, light emitting from the window member 23 is blocked by the blocking portion 32 of the window open-closing shutter 30. As described above, when the waste developer receptacle 100 is separated, the window open-closing shutter 30 blocks the window member 23 of the light scanning unit 20 to prevent the window member 23 from being contaminated by scattered developer.

After the user removes waste developer from the waste developer receptacle 100, the user remounts the waste developer receptacle 100 into the first opening 6. After the waste developer receptacle 100 is remounted into the first opening 6, the shutter operating lever 40 is moved in the direction of arrow D by the waste developer receptacle 100, and then, the window open-closing shutter 30 is moved in the direction of arrow A by the shutter operating lever 40 so that the light slot 31 is positioned above the window member 23. Accordingly, when the light scanning unit 20 emits light, the light can become incident on the photosensitive medium 53 through the light slot 31.

When the window open-closing shutter 30 is moved by mounting and separating of the waste developer receptacle 100, if the window cleaning member 110 is disposed on the bottom surface of the window open-closing shutter 30, the window cleaning member 110 is moved to clean developer attached on the window member 23. A process for the window cleaning member 110 to clean the window member 23 will be explained with reference to FIGS. 10A, 10B, and 100, hereinafter.

Figure 10A:
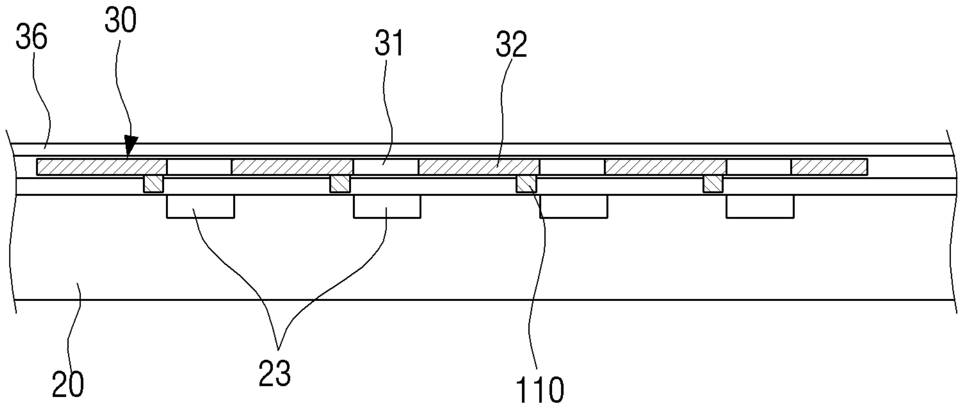
FIGS. 10A, 10B, and 10C are partial sectional views illustrating states in which a window member of a light scanning unit is cleaned by a window cleaning member when a window open-closing shutter of the light scanning unit operates in an image forming apparatus.

After the waste developer receptacle 100 is mounted, the image forming apparatus 1 can normally perform printing. At this time, the shutter operating lever 40 is maximally moved by the waste developer receptacle 100, as illustrated in FIG. 9C, so as to be positioned at the bottom end 33*b* of the inclined portion 33 of the window open-closing shutter 30. Then, the light slot 31 of the window open-closing shutter 30 is positioned above the window member 23 of the light scanning unit 20 so that the light emitting from the window member 23 of the light scanning unit 20 passes through the light slot 31 of the window open-closing shutter 30 and becomes incident on the photosensitive medium 53. At this time, the window cleaning member 110 is positioned at the left side of the window member 23 as illustrated in FIG. 10A. Accordingly, the light emitting from the window member 23 of the light scanning unit 20 does not interfere with the window cleaning member 110.

After that, when the waste developer receptacle 100 is filled with waste developer, the user separates the waste developer receptacle 100 from the first opening 6 of the image forming apparatus 1. After the waste developer receptacle 100 is separated, the second end 42 of the shutter operating lever 40 projects in the first opening 6 by the elastic member 43 and the window open-closing shutter 30 is moved in the direction of arrow B (see FIG. 9C) by the restoring member 39. At this time, the window cleaning member 110 disposed on the bottom surface of the window open-closing shutter 30 passes the top surface of the window member 23 while being in contact with the top surface of the window member 23.

When the second end 42 of the shutter operating lever 40 is maximally projected in the first opening 6 by the elastic member 43, the shutter operating lever 40 does not press the inclined portion 33 of the window open-closing shutter 30. As illustrated in FIG. 9A, when the shutter operating lever 40 does not press the inclined portion 33 of the window open-closing shutter 30, the window cleaning member 110 is positioned at the right side of the window member 23 as illustrated in FIG. 100. Accordingly, the light emitting from the window member 23 of the light scanning unit 20 does not interfere with the window cleaning member 110.

After the user removes the waste developer from the waste developer receptacle 100 and remounts the waste developer receptacle 100 into the first opening 6, the waste developer receptacle 100 presses the second end 42 of the shutter operating lever 40. Then, the first end 41 of the shutter operating lever 40 presses the inclined surface 33*a* of the inclined portion 33 of the window open-closing shutter 30 so that the window open-closing shutter 30 is moved in the direction of arrow A. At this time, the window cleaning member 110 disposed on the bottom surface of the window open-closing shutter 30, as illustrated in FIG. 10B, passes the top surface of the window member 23 while being in contact with the top surface of the window member 23.

Figure 10B:
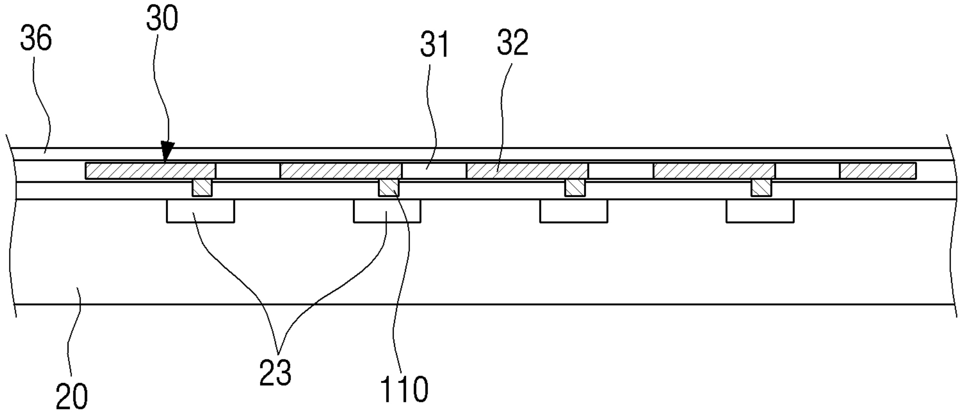
Figure 10C:
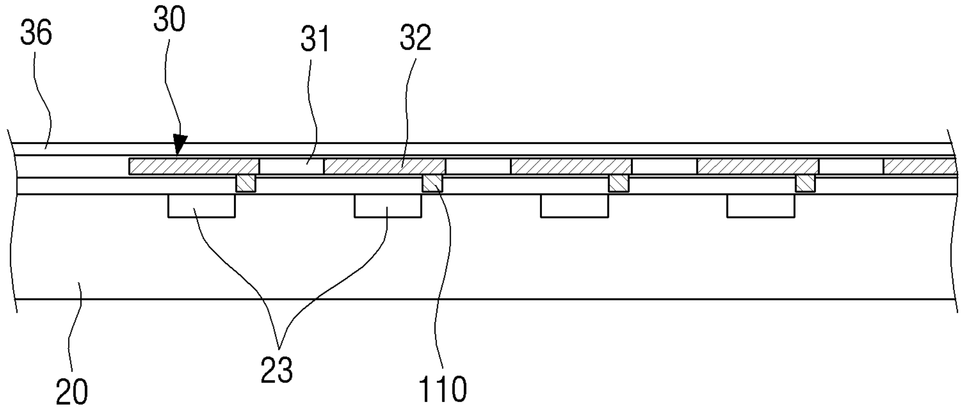

When the shutter operating lever 40 is maximally moved and is positioned at the bottom end 33*b* of the inclined portion 33 of the window open-closing shutter 30, the light slot 31 of the window open-closing shutter 30, as illustrated in FIG. 10B, is positioned above the window member 23. Then the window cleaning member 110 is moved to the left side of the window member 23 to return to the original position thereof.

As described above, the window cleaning member 110 performs two passes over the top surface of the window member 23 of the light scanning unit 20 during the separating and mounting operation of the waste developer receptacle 100. Accordingly, developer or/and paper dust attached on the top surface of the window member 23 of the light scanning unit 20 is removed by the window cleaning member 110 that moves while rubbing against the window member 23.

When a waste developer receptacle is separated, a window open-closing shutter of a light scanning unit blocks a window member, so the light scanning unit can be prevented from being contaminated by developer scattered when the waste developer receptacle is replaced.

Also, when a photosensitive medium unit and a developing roller unit of an image forming unit are changed, developer can be scattered and contaminate a light scanning unit. However, with an embodiment of the present disclosure, a waste developer receptacle is first separated before the photosensitive medium unit and the developing roller unit are changed. When the waste developer receptacle is separated, a window open-closing shutter blocks a window member of the light scanning unit to prevent the light scanning unit from being contaminated by the scattered developer.

In the above description, the waste developer receptacle, the photosensitive medium unit, and the developing roller unit press the shutter operating lever. However, the present disclosure is not limited by the above disclosure. Various parts can be disposed to activate the shutter operating lever as long as they can be detachably disposed in the main body of the image forming apparatus.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An image forming apparatus comprising:

a main body of the image forming apparatus;

at least one image forming unit disposed in the main body;

a light scanning unit that is disposed in the main body and scans light to form an electrostatic latent image on a photosensitive medium of the at least one image forming unit;

a window open-closing shutter that is disposed to slidably move on a surface of the light scanning unit from which light emits, and moves between an open position where a light moving path is opened and a blocking position where the light moving path is blocked;

a shutter operating lever that is disposed in the main body an on the same plane with the window open-closing shutter, and activates the window open-closing shutter to be positioned at either of the open position and the blocking position; and a pressure member that is detachably disposed in the main body and presses the shutter operating lever.

2. The image forming apparatus of claim 1, wherein the window open-closing shutter comprises an inclined portion to come in contact with the shutter operating lever, wherein when an end of the shutter operating lever presses the inclined portion, the window open-closing shutter is positioned at the open position, and when the end of the shutter operating lever does not press the inclined portion, the window open-closing shutter is positioned at the blocking position.

3. The image forming apparatus of claim 2, wherein the window open-closing shutter and the shutter operating lever move in directions perpendicular to each other.

4. The image forming apparatus of claim 3, wherein the window open-closing shutter moves in a sub-scanning direction and the shutter operating lever moves in a main scanning direction.

5. The image forming apparatus of claim 1, further comprising:

a restoring member that restores the window open-closing shutter to an original position thereof.

6. The image forming apparatus of claim 5, wherein the restoring member comprises a compression coil spring.

7. The image forming apparatus of claim 1, wherein the pressure member comprises a waste developer receptacle disposed at a side of the at least one image forming unit in the main body.

8. The image forming apparatus of claim 1, wherein the pressure member comprises a door that is disposed in the main body, and opens and closes a portion of the main body to access an interior of the main body.

9. The image forming apparatus of claim 1 further comprising:

a lever guiding member that is disposed in the main body and guides the shutter operating lever to slidably move.

10. The image forming apparatus of claim 9 further comprising:

an elastic member that is disposed in the lever guiding member and elastically supports the shutter operating lever.

11. The image forming apparatus of claim 1, wherein the light scanning unit further comprises:

a window member through which the light passes, and a window cleaning member that is disposed on the window open-closing shutter and cleans the window member by sliding movement of the window open-closing shutter.

12. The image forming apparatus of claim 11, wherein the window cleaning member is formed of rubber.

13. A method for preventing developer from contaminating a window member of a light scanner in an image forming apparatus when emptying a waste developer receptacle mounted in the image forming apparatus, the method comprising:

operating, by the waste developer receptacle, a shutter operating lever when the waste developer receptacle is removed from or mounted to the image forming apparatus, wherein the shutter operating lever moves a window open-closing shutter to block the developer from contaminating the window member when the waste developer receptacle is removed, and the shutter operating lever moves a window open-closing shutter to allow light emitted from the window member to pass through the window open-closing shutter when the waste developer receptacle is mounted.

14. The method of claim 13, further comprising:

cleaning the window member with the window open-closing shutter as the window open-closing shutter is moved.

15. An image forming apparatus capable of preventing developer from contaminating a window member of a light scanner in the image forming apparatus when emptying a waste developer receptacle mounted in the image forming apparatus, the image forming apparatus comprising:

a light scanner which emits light to form an electrostatic latent image on a photosensitive medium;

a window member through which the light passes;

a window open-closing shutter which moves between an open position where the window member is exposed and a blocking position where the window member is covered; and a shutter operating lever that activates the window open-closing shutter to be positioned at the open position when the waste developer receptacle is mounted to the image forming apparatus, and at the blocking position when the waste developer receptacle is removed from the image forming apparatus.

16. The image forming apparatus of claim 15, wherein the window open-closing shutter comprises an inclined portion to come in contact with the shutter operating lever, wherein when an end of the shutter operating lever presses the inclined portion, the window open-closing shutter is positioned at the open position, and when the end of the shutter operating lever does not press the inclined portion, the window open-closing shutter is positioned at the blocking position.

17. The image forming apparatus of claim 16, wherein the window open-closing shutter and the shutter operating lever move in directions perpendicular to each other on the same plane.

18. The image forming apparatus of claim 15, further comprising:

a restoring member that restores the window open-closing shutter to an original position thereof.

19. The image forming apparatus of claim 15, further comprising:

a pressure member that is disposed in a main body of the image forming apparatus and presses the shutter operating lever.

20. The image forming apparatus of claim 19, wherein the pressure member comprises a waste developer receptacle disposed at a side of at least one image forming unit in the main body.

* * * * *

UNITED STATES PATENT AND TRADEMARK OFFICE

CERTIFICATE OF CORRECTION

PATENT NO. : 8,918,009 B2
APPLICATION NO. : 13/552254
DATED : December 23, 2014
INVENTOR(S) : Byung-jo Lee et al.

It is certified that error appears in the above-identified patent and that said Letters Patent is hereby corrected as shown below:

In the Claims

Claim 1, Column 11, Line 62:

Delete "an" and insert --and--, therefor.

Signed and Sealed this
Thirtieth Day of June, 2015

Michelle K. Lee

Michelle K. Lee
*Director of the United States Patent and Trademark Office*